July 9, 1957    L. S. AUER    2,798,747
TUBING-HEAD STUD LOCK
Filed May 7, 1954
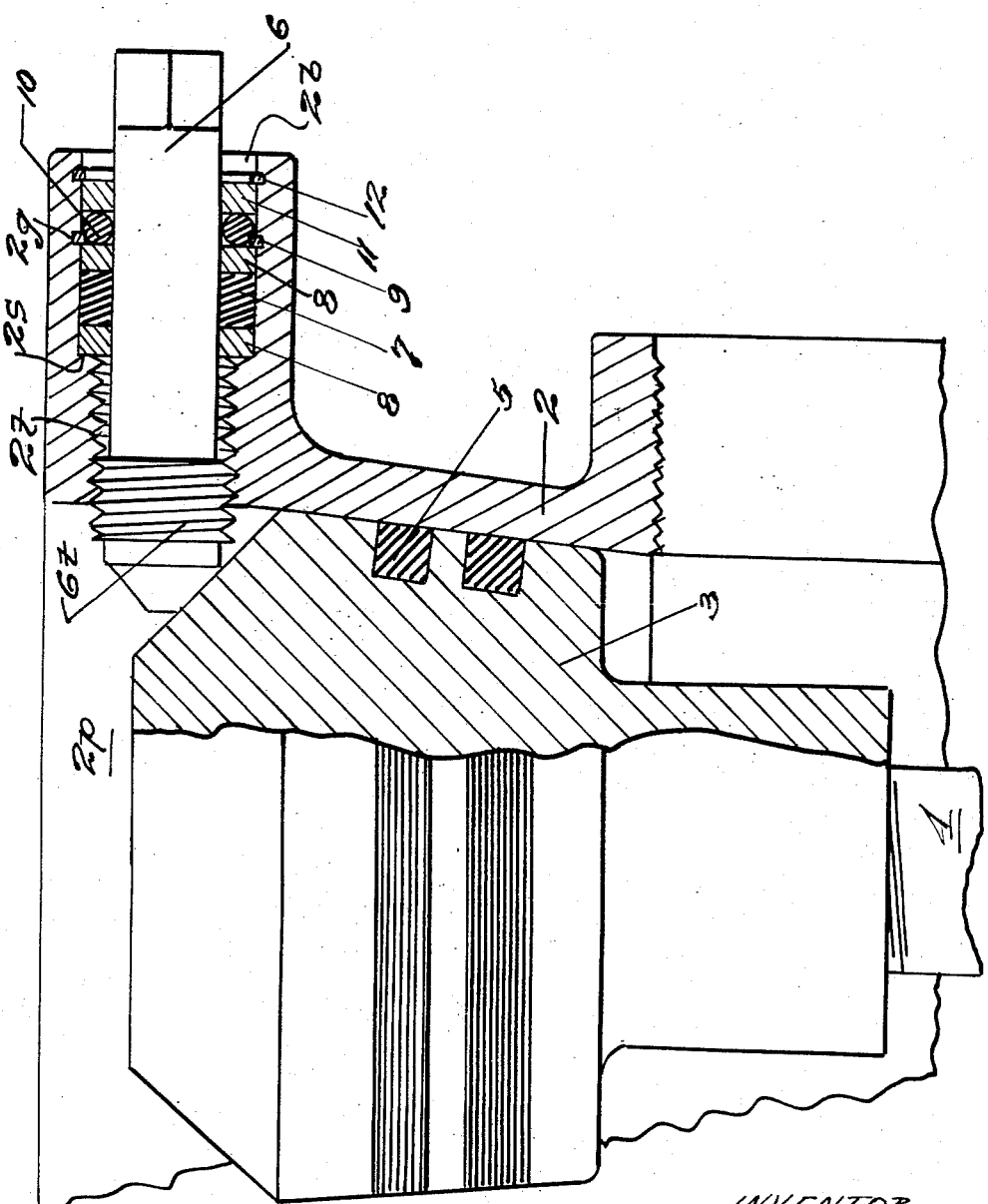
INVENTOR,
Leland S. Auer;
Frederick E. Maynard,
Attorney.

United States Patent Office 2,798,747
Patented July 9, 1957

2,798,747
TUBING-HEAD STUD LOCK

Leland S. Auer, Brea, Calif., assignor to Shaffer Tool Works, Brea, Calif., a corporation of California Application May 7, 1954, Serial No. 428,169

3 Claims. (Cl. 286—7)

This invention concerns casing heads for deep well apparatus and is a novel, packed stud for locking a tubing hanger in its casing head.

Casing heads include types in which there is a topend, axial pocket for seating a tubing hanger whereby a string of tubing is suspended in a well hole.

An intent of this invention is to provide a simple, practical, reliable, efficient and low cost packing means for a stud screwed radially into the head to jam or lock an installed hanger.

An object is to provide a double unit packing system in which the units are arranged in series on the stud and so removably locked in place that the outer unit may be removed at will while the inner unit remains in situ to function as the packing medium in the absence of the outer packing unit.

The invention resides in certain advancements in this art as set forth in the ensuing disclosure and has, with the above, additional objects and advantages as hereinafter developed, and whose construction, combinations, details of means and manner of operation will be made manifest in the following description of the herewith illustrative embodiment; it being understood that modifications, variations, adaptations and equivalents may be resorted to within the scope, spirit and principles of the invention as it is claimed in conclusion hereof.

The drawing is an axial section of a broken-away casing head, partly in elevation.

The head 2 provides a top-end, axial pocket 2p in which is an installed, complementary, removable hanger 3 which suspends a tubing setcion 4; the rim of the hanger having suitable packing 5 to seal on the bore wall of the pocket.

The top flange of the head has a hole leading radially from the pocket and whose inner end is threaded at 2t and outwardly of which the hole is counterbored at 2b and provides a transverse, bore shoulder 2s. Further, the wall of the counterbore is provided with a pair of spaced ring grooves 2g.

For the purpose of locking the hanger onto its pocket seat there is provided an elongate-shank stud 6 the inner end of which has threads 6t to engage the threads 2t and as it is screwed in the stud engages and jams the hanger in place.

A significant feature of this invention resides in a simple and practical packing system for the stud for the purpose of enabling the change of one of the packing units at will while the other remain in packing function about the set stud. An inner or secondary unit includes an elastic packing band 7 flanked by metal rings 8 one of which lodges against the bore shoulder 2s: this unit is removably locked in packing position by a split-spring expansion ring 9 snapped into the inner ring groove 2g. The unit 7—8 remains in place when the stud is screwed to or from the crown of the hanger.

The other, outer or primary packing unit includes preferably a highly efficient O-type packing ring 10 lodged against the outer metal collar 8 and is removably locked in packing position by an end collar 11 which is removably locked by its snap ring 12 in the outer ring groove 2g; all as illustrated.

It will therefore be clear that for any reason the outer packing unit 10—11 may be unlocked and extracted and replaced, if need be, whilst the inner unit remains in effective functioning position on the stud 6 and seals on the face of the bore 2b.

What is claimed is:

1. A stud lock and sealing means therefor for use in tubing heads having a radially extending boss with a longitudinal bore therethrough, internal threads adjacent the inner end of said bore, and a counterbore at the outer end of said bore, said counterbore having a shoulder at the inner end thereof and a pair of axially spaced annular grooves in the walls thereof: a locking bolt having a smooth shank extending through said counterbore, said bolt having external threads adjacent the inner end, there being an inner end portion of said bolt adapted to extend into the interior of the head, and an outer end portion formed to receive an actuating tool, said outer end portion extending outwardly of said boss; an annular metal ring on the shank of said bolt, said ring being disposed at the inner end of the counterbore and engageable with said shoulder; annular packing means on the shank of said bolt at the outer side of said ring, and a second metal ring on the shank of said bolt at the outer side of said packing means; a snap ring received in the innermost of said grooves and at the outer side of the last mentioned metal ring for securing the said metal rings and packing means in sealing position; an O type packing ring on said shank disposed against the second mentioned metal ring; an annular collar on said shank at the outer side of said O type packing ring; and a locking ring for securing said collar in the counterbore, said locking ring being removably received in the outermost annular groove in the wall of the counterbore.

2. In a stud lock and sealing means therefor for use in tubing heads having a radially extending stud hole, internal threads adjacent the inner end of said hole, and a counterbore at the outer end of said hole, said counterbore having a shoulder at the inner end thereof and a pair of axially spaced annular grooves in the walls thereof; a locking bolt having a smooth shank extending through said counterbore, said bolt having external threads adjacent the inner end, there being an inner end portion of said bolt adapted to extend into the interior of the head, and an outer end portion formed to receive an actuating tool; an annular metal ring on said bolt, said ring being disposed at the inner end of the counterbore and engageable with said shoulder; annular packing means on said bolt at the outer side of said ring, and a second metal ring on said bolt at the outer end of said packing means; a snap ring received in the innermost of said grooves and at the outer side of the last mentioned metal ring for securing the said metal rings and packing means in sealing position; an O type packing ring disposed against the second mentioned metal ring; an annular collar at the outer side of said O type packing ring; and a locking ring for securing said collar in the counterbore, said locking ring being removably received in the outermost annular groove in the wall of the counterbore.

3. In a lock and seal therefor, for use in a bore having internal threads adjacent the inner end, and a counterbore at the outer end of said bore, said counterbore having a shoulder at the inner end thereof and a pair of axially spaced annular grooves in the walls thereof; a locking bolt having external threads adjacent the inner end and a smooth shank disposed in said counterbore when said bolt is screwed into the threads of said bore; an annular metal ring on said shank, said ring being disposed at the inner end of the counterbore and engageable with said shoulder; annular packing means on said shank at the outer side of said ring, and a second metal ring on said shank at the outer end of said packing means; a snap ring received in the innermost of said grooves and at the outer side of the last mentioned metal ring for securing the said metal rings and packing means in sealing position; an O type packing ring disposed on said shank, against the second mentioned metal ring; an annular collar on said shank at the outer side of said O type packing ring; and a locking ring for securing said collar in the counterbore, said locking ring being removably received in the outermost annular groove in the wall of the counterbore.

References Cited in the file of this patent

UNITED STATES PATENTS

| | | |
|---|---|---|
| 1,028,758 | Mason et al. | June 4, 1912 |
| 1,871,351 | Wentz | Aug. 9, 1932 |
| 2,077,507 | Yancey | Apr. 20, 1937 |
| 2,090,956 | Wheeler | Aug. 24, 1937 |
| 2,178,549 | Block | Nov. 7, 1939 |
| 2,312,487 | Roach et al. | Mar. 2, 1943 |
| 2,472,466 | Counts et al. | June 7, 1949 |
| 2,593,193 | Rockwell | Apr. 15, 1952 |
| 2,647,774 | Newberry | Aug. 9, 1953 |
| 2,666,829 | Burkhard et al. | Jan. 19, 1954 |
| 2,670,225 | McKinney | Feb. 23, 1954 |